(12) United States Patent
Tousi et al.

(10) Patent No.: US 6,471,179 B1
(45) Date of Patent: Oct. 29, 2002

(54) ISOLATION MOUNT

(75) Inventors: Shahram Tousi, Canton, MI (US); Mickey Love, Londonberry, NH (US); Casimir R. Kiczek, Ann Arbor, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 09/560,764

(22) Filed: Apr. 28, 2000

(51) Int. Cl.[7] .............................................. F16M 13/00
(52) U.S. Cl. ...................... 248/635; 248/634; 296/35.1; 267/141.2
(58) Field of Search ................................ 248/634, 635, 248/632; 296/35.1; 267/153, 141, 141.2

(56) References Cited

U.S. PATENT DOCUMENTS

| | | | |
|---|---|---|---|
| 2,520,757 A | * | 8/1950 | Cain |
| 3,128,999 A | * | 4/1964 | Schmitt |
| 3,304,043 A | * | 2/1967 | Beck |
| 3,675,881 A | * | 7/1972 | Caldwell |
| 3,809,427 A | | 5/1974 | Bennett |
| 3,895,408 A | * | 7/1975 | Leingang |
| 3,927,730 A | | 12/1975 | Winslow |
| 4,286,777 A | | 9/1981 | Brown |
| 5,110,081 A | | 5/1992 | Lang, Jr. |
| 5,170,985 A | | 12/1992 | Killworth et al. |
| 5,405,118 A | | 4/1995 | Dietz et al. |
| 5,409,283 A | | 4/1995 | Ban |
| 5,551,661 A | | 9/1996 | Bunker |
| 5,580,028 A | | 12/1996 | Tomczak et al. |
| 5,746,411 A | | 5/1998 | Braus et al. |
| 5,799,930 A | | 9/1998 | Willett |
| 5,842,677 A | | 12/1998 | Sweeney et al. |
| 5,957,427 A | | 9/1999 | Hanson |
| 6,029,942 A | * | 2/2000 | Daddis, Jr. et al. |
| 6,131,875 A | * | 10/2000 | Fan .............. 248/635 |
| 6,220,585 B1 | * | 4/2001 | Heron .......... 267/153 |

* cited by examiner

Primary Examiner—Ramon O. Ramirez
Assistant Examiner—Korie Chan
(74) Attorney, Agent, or Firm—A. Michael Tucker; Casimir R. Kiczek

(57) ABSTRACT

An isolation mount for use in a motor vehicle is disclosed. The motor vehicle has a body portion and a subframe portion. The subframe has a through hole. The isolation mount includes a thimble member having a flanged portion and an axially extending tube portion. An annular foamed elastomeric member is adjacent to the thimble member. The annular member having a radially outwardly extending one end portion, an opposite end portion and an inner passage. The opposite end portion is acceptable in a slidable fit into the through hole from one side of the subframe portion to the other side. The opposite end portion being movable radially outwardly when the opposite end is axially advanced past said through hole and said one end portion being axially advanced to be adjacent to the one side of the subframe portion. The length of the annular member is related to the length of the through hole so that when the tube portion is inserted into the inner passage at the opposite end portion, the thimble member advances axially toward the one end and the flanged member compresses the radially outwardly potion until the end of the tube portion is adjacent to the one end portion of the annular member. Optionally, a rubber bushing member is disposed around the axially extending portion to improve the stiffness and the stiffness rate in the lateral and fore and aft directions.

8 Claims, 3 Drawing Sheets

ISOLATION MOUNT

BACKGROUND OF THE INVENTION

The present invention relates to an isolation mount used in securing a vehicle body to a support structure, such as a vehicle cradle mount or subframe, and for absorbing vibrations and movements between the two structures.

Subframe mounts are used extensively in unibody vehicles to isolate the vibration which is transmitted from the engine to the subframe and the body. The subframe mount also improves vehicle dynamics by providing vertical stiffness, lateral stiffness and fore and aft stiffness and their respective stiffness rates. The operator of the vehicle perceives that vibration isolation relates to ride quality and that improved vehicle dynamics translates into improved handling performance.

Typically, there are as many as four locations on the subframe where an isolation mount is utilized. The subframe is sandwiched between the upper portion and the lower portion of the vibration mount and the vehicle body rests on top of the upper mount. A bolt extends through an aperture in the frame and the isolation mount. The lower mount and the upper mount are connected by a cage nut on the body to complete the attachment of the body to the subframe. The mount isolates engine or transmission induced vibration that is transmitted along the subframe to the body. The mount also improves vehicle dynamics by controlling or attenuating the relative movement between the vehicle body and subframe in the vertical mode or plane, that is up and down, relative movement, and also to control lateral mode or plane, that is side to side movement, and fore and aft mode or plane, that is front to back relative movement.

A typical design of a subframe isolation mount employs a relatively hard or high durometer rubber (typically 40 to 80 Shore A) as an isolating material. High durometer rubber for cradle or subframe mounts is an excellent material for improved handling in the lateral plane, especially when it is combined with rate plates to stiffen the response in the lateral plane and to a limited degree the fore and aft plane. However, since the solid elastomeric material is generally very stiff, it does not control or attenuate vertical forces from the subframe to the body very effectively. As a result, the isolation mount has a high lateral stiffness rate response which is desirable but a fore and aft stiffness rate response which is moderately acceptable and vertical stiffness rate response which is low. Therefore, good ride and handling of a vehicle are compromised because of the stiffness properties of the solid elastomeric material.

Thus, there is a need for a vibration isolation mount that provides for ride quality that is satisfactory to the operator without sacrificing the handling characteristics of the vehicle in the lateral plane, fore and aft plane and vertical plane. Additionally, there is a need for a mount that is lighter in weight, improves durability and reduces both initial and high mileage noise, vibration, and harshness between a subframe and a body.

SUMMARY OF THE INVENTION

The present invention discloses a one piece formed elastomeric isolation mount for motor vehicles The motor vehicle has a body portion and a subframe portion. The subframe has a through hole. The isolation mount includes a thimble member having a flanged portion and an axially extending tube portion. An annular foamed elastomeric member is adjacent to the thimble member. The annular member having a radially outwardly extending one end portion, an opposite end portion and an inner passage. The opposite end portion is acceptable in a slidable fit into the through hole from one side of the subframe portion to the other side. The opposite end portion being movable radially outwardly when the opposite end is axially advanced past said through hole and said one end portion being axially advanced to be adjacent to the one side of the subframe portion. The length of the annular member is related to the length of the through hole so that when the tube portion is inserted into the inner passage at the opposite end portion, the thimble member advances axially toward the one end and the flanged member compresses the radially outwardly potion until the end of the tube portion is adjacent to the one end portion of the annular member.

It is an object of the present invention to provide a one piece formed elastomeric isolation mount which attenuates the vibration transmitted from the subframe to the body as well as providing vertical mode, lateral mode, and fore and aft mode stiffness for improved vehicle dynamics.

These and other features of the present invention will become apparent from the subsequent descriptions and drawings.

BRIEF DESCRIPTION OF THE DRAWINGS

The various advantages of the present invention will become apparent to one skilled in the art upon reading the following specification and by reference to the drawings which include.

DETAILED DESCRIPTION OF THE PREFERRED EMBODIMENT

Figure 1:
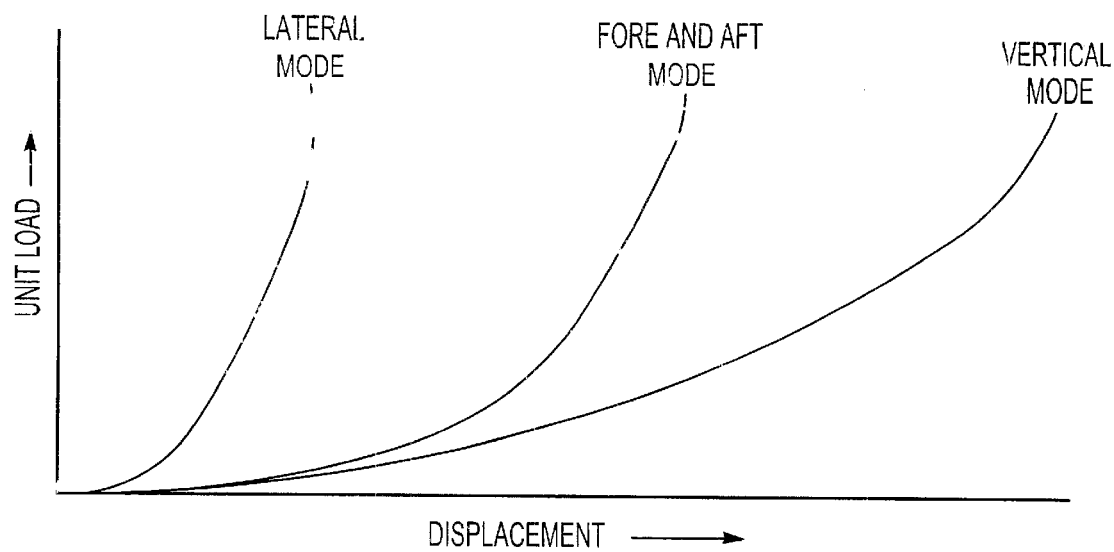
FIG. 1 is the theoretical relationship of displacement versus load for a mount in a vehicle.

As used herein, fore and aft mode shake means front to back movement or displacement which is along the longitudinal axis of the vehicle and transverse of the axis of a mount and is identified by the letters F & A. Vertical mode shake means up and down movement or displacement which is along the axial axis of a mount and identified by the letter V. Lateral mode shake means side to side movement or displacement that is transverse of the longitudinal axis of the vehicle and is perpendicular to the fore and aft mode shake and identified by the letter L. Lateral shake stiffness is the displacement of a mount in the lateral mode shake direction divided by unit load. Vertical mode shake stiffness is the displacement of a mount in the vertical mode shake direction divided by unit load. Fore and aft shake stiffness is the displacement of a mount in the fore and aft mode shake direction divided by unit load. The relationship of lateral mode, fore and aft mode and vertical mode load versus displacement is shown in FIG. 1.

Figure 3:
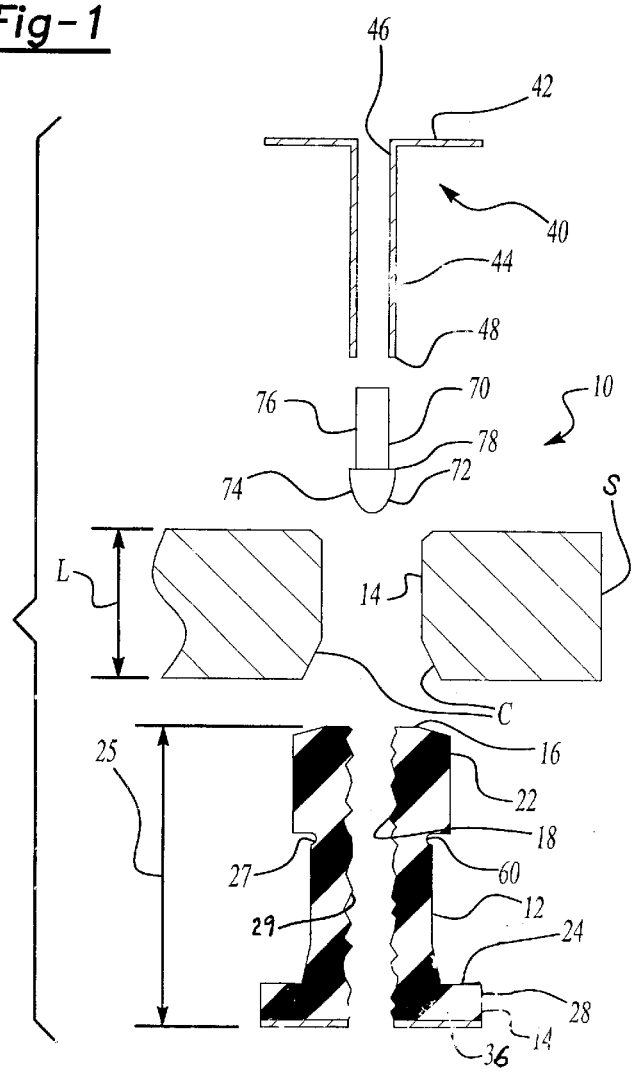
FIG. 3 is an exploded, sectional view of the isolation mount according to the preferred embodiment prior to installation in the vehicle.
Figure 2:
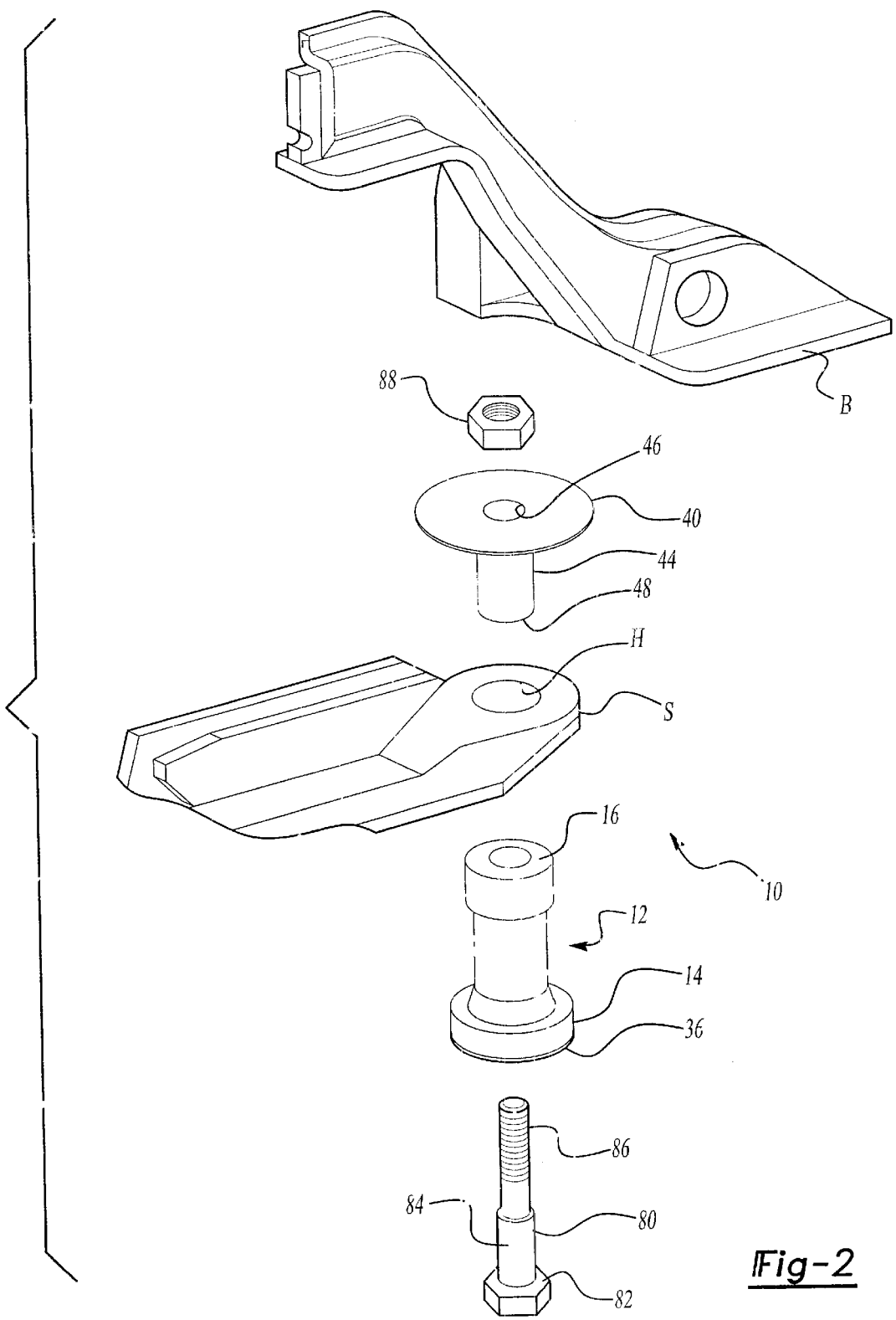
FIG. 2 is an exploded view of the isolation mount according to the invention installed in a vehicle.
Figure 4:
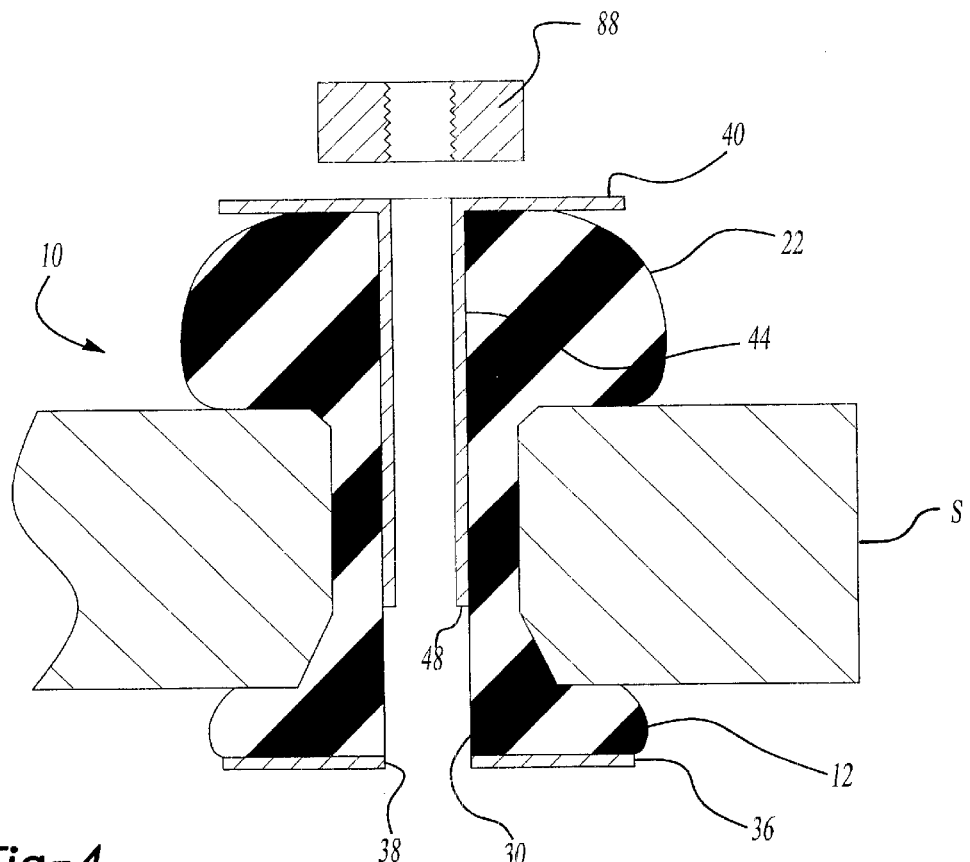
FIG. 4 is a sectional view of the isolation mount according to the preferred embodiment with the isolation mount partially installed in the subframe of the vehicle.

An isolation mount according to the present invention is designated by the numeral 10 as shown in FIGS. 2–4. The mount 10 includes an isolation member 12, with an internal cavity 18 extending from its bottom end 14 to its top end 16. The internal cavity or surface 18 has an internal surface 29. The shape of the mount 10 is designed to be inserted into a hole H in the subframe or cradle S. The hole H has a chamfered edge C and flats F to orient the mount 10 for insertion into the cradle S. The hole H has a depth or length L. The mount 10 is located between the body B and the subframe S.

Preferably, the isolation member 12 initially has a thimble like shape or L-shaped in partial cross section. Optionally, the member 12 may be I-shaped or any other suitable shape that can be used to practice the invention. The outer diameter 28 of the isolation mount 10 is larger than the inner diameter of hole H. The isolator 12 is compressed or squeezed radially to permit insertion of the top portion 16 of the isolator 12 into the hole H. Thus, the isolator 12 is first compressed radially and advanced axially into one side of the hole H until the isolator 12 emerges out of the other side of the hole H. The isolator 12 continues to be advanced axially until the bottom flanged portion 24 is adjacent to the one side of the hole H and the top portion 22 of the isolator 12 extends above the other side of the hole H.

The mount 10 has a through hole 30 which extends axially from each end into the internal cavity 18. The uncompressed isolator 12 has an overall axial length 25 that is greater than the axial depth or length L of the hole H in the subframe S. The axial height of the top portion 22 above the other side of the frame S and the axial height 23 of the bottom portion 29 below the one side of the frame S may be equal to each other or height 21 may be greater than height 23 or height 21 may be less than height 23 depending on the vertical response rate desired in the vehicle.

With the top portion 22 extending above the top surface of the subframe S, a tubular member 40 is employed to compress the top portion 22 as shown in FIG. 4. As this occurs, the top portion 22 is moved radially outward of the inner diameter of the hole 30. To facilitate the radially outward movement of the top portion 22, the isolator 12 has a semi-circular, shaped, annular notch 60 formed in its outer periphery 26 at a predetermined distance from the top portion 22. This notch 60 functions as a hinge point 27 to facilitate the movement of the top portion 22 of the isolator 12 radially outward as the top portion 12 is compressed axially.

The tubular member 40 includes a flanged member 42, an axially extending tubular portion 44 and a central bore 46. The tubular member 40 is preferably made of a metal such as steel, aluminum or magnesium. Alternatively, the tubular member 40 may be made of thermoplastic or thermoset material. The tubular member 40 can also be made of a combination of metal and plastic material in practicing the invention.

The isolator 12 continues to be compressed axially so that the free end 48 of the tubular portion 44 extends axially into the through hole 30 so that the free end 48 is near the bottom end 14 of the isolator 12. In order to prevent the isolator 12 from being damaged by the free end 48 during the insertion operation, an insertion tool 70 is employed. The insertion tool 70 includes an axially extending tubular member or stem 76 with a substantially bullet shaped nose 72. The stem 76 is slip fit into the inner diameter 46 of the tubular portion 44 of the tubular member 40. The bullet shaped nose 72 has an outer diameter 78 that is larger than the inner diameter 46 of the tubular member 40. The nose 72 has a smooth arcuate surface 74 to facilitate insertion of the metal tubular member 40 into the through hole 30 and cavity 18 of the isolator 12.

The nose 72 compresses the inner diameter of the through hole 30 and the internal surface 18 of the isolator 12 in order to permit the free end of the tubular member to be inserted into the inner diameter of the through hole 30 without damaging the isolator 12. Once past the isolation member 12, the nose 72 extends through the inner diameter 38 of the bottom washer 36. The outer diameter 78 of the bullet nose 72 is smaller than the inner diameter 38 to facilitate the passage of the tubular member through the isolator 12 and the removal of the nose piece 72.

Once the bullet nose 72 is removed from the insertion tool, a threaded fastener 80 is inserted into the central bore 46 of the tubular member 40. The head portion 82 of the fastener 80 is inserted into the inner diameter 38 and abuts against the flange of the bottom washer 36. Additionally, the shoulder portion 84 of the fastener 80 extends axially through the inner diameter 38 of the bottom washer 36. The threaded portion 86 of the fastener 80 extends axially past the washer 36 where a threaded nut 88 is used to engage the threads 86 of the fastener 80 of the and clamp the mount 10 between the cradle S and body B.

The vertical response rate of the mount 10 is determined by the axial height of the isolator protruding above and below the subframe hole H. The axial length of the tubular member 40 can be varied depending on the amount of precompressive load desired on the isolator 12. The lateral response rate is determined by the amount of precompression on the isolator. The lateral response rate is also related to the inner diameter of the hole H, the inner diameter of the isolator 12, the height 21, the height 23, and the resulting compressive force on the inner diameter of the isolator 12. Typically, the amount of precompression on the inner diameter of the isolator 12 can range between 30% to 80% to achieve high lateral stiffness.

The isolation member 12 is an annular member made of foamed elastomeric material. Preferably, the foamed elastomeric material is highly compliant, such as microcellular polyurethane (MCU). A highly compliant material is desired since the top portion 22 of the isolation member 12 is inserted into the hole H of the subframe S until the top portion 22 extends axially above the top one side on top of the subframe S. Alternatively, the foamed elastomeric material may be a fluorocarbon, highly saturated nitrile (HBNR), methyl acrylate acid polymer, silicone, EPDM, Neoprene®, or thermoset elastomer or any other elastomeric foamed material suitable for the application.

Foamed microcellular polyurethane is a polymer product obtained from the interaction of the di-isocyanate glycol and a blowing agent. The glycol is usually a polyol which can be of either the polyester or polyether type. Both types generally have hydroxyl groups that are free to react with the di-isocyanate. The polyesters are low molecular weight macroglycols. The isocyanate reacts with water to produce carbon dioxide gas for foaming. Foam density is determined by the quantity of water present in the formulation and is characterized by the weight of the polyurethane material divided by the overall volume of the part. Once intimately mixed, the ingredients are discharged from a mixer and deposited into a mold where the complex chemical reactions take place to form the microcellular polyurethane.

The isocyanate also reacts with water to produce carbon dioxide gas for foaming. Foam density is determined by the quantity of water present in the formulation and is characterized by the weight of the polyurethane material divided by the overall volume. Once intimately mixed, the ingredients are discharged from the mixer and deposited into a mold where the complex chemical reactions take place.

The chemical reactions are primarily exo-thermic which converts the liquid into a foam. This technology is known in the prior art. See *Rubber Technology, Third Edition*, edited by Maurice Morton-Van Norstand Reinhold, ISBN 0-442-2642204, pages 555–560, which is incorporated by reference herein. The damping characteristics of a microcellular polyurethane foam are adjusted by the amount of gases trapped in the body of the polyurethane. Thus, the stiffness, and the vibration characteristics of the microcellular polyurethane can be adjusted by varying MCU density to meet specific application requirements. Microcellular polyurethane foam density varies from 0.3 to 0.8 grams per cubic centimeter. Preferably, the range of density is 0.4 to 0.6 grams per cubic centimeter. The typical characteristics of MCU elastomers as compared to solid rubber are primarily influenced by the microcellular structure of the material and not by the chemical backbone or primary polymeric material. Due to the microcellular nature of the MCU material, polyurethane cells will collapse on top of each other under compressing load. This in turn will provide for a higher vertical stiffness and hence permits tuning of the ride characteristics in the vertical mode direction.

Optionally, the amount of lateral stiffness of the mount 10 can be improved by inserting a larger outer diameter tube portion 44 or a rubber bushing member 50 into the through hole 30 of the isolator 12 after the isolator is inserted into the hole H or simultaneously as the tubular member 40 is inserted into the isolator 12.

The tubular member 40 and the washer 36 are preferably made of metal such as steel, aluminum or magnesium. Alternatively, the tubular member 40 and the washer may be made of a thermoset plastic material such as phenolic, polyester or vinylester or any other suitable material or a combination of metal and plastic that is suitable for practicing the invention.

Figure 5:
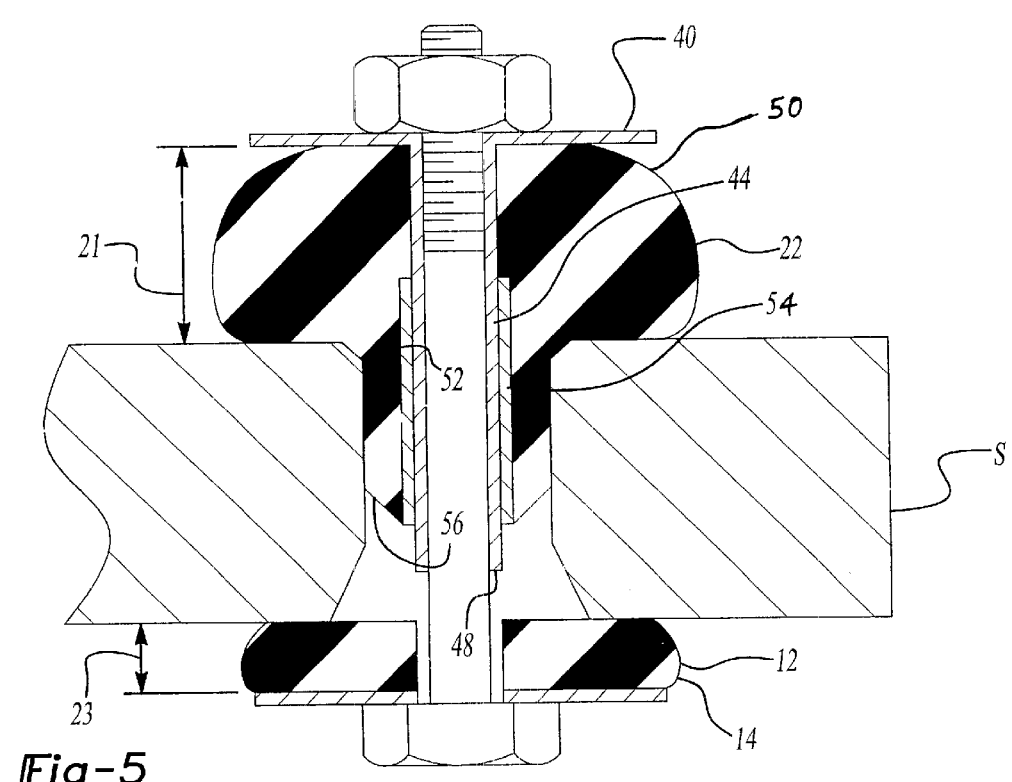
FIG. 5 is a section view of the isolation mount according to an alternate embodiment with the isolation mount installed in the subframe of the vehicle.

As best shown in FIG. 5, the rubber bushing member 50 has a rubber annular portion 52, and an annular collar 54 which is bonded to it. The annular portion 52 preferably has a tapered edge 56 to facilitate insertion of the member 50 into the through hole 30. The collar 54 may be pressed, fastened or bonded onto the tubular portion 44 of the member 40 so that the bushing member 50 does not slip axially relative to the portion 44 of the tubular member 40 during the insertion process. The collar 54 is preferably a metal such as steel, aluminum or magnesium. Optionally, the collar may be a thermoplastic or thermoset material. The rubber portion 52 is preferably made of natural rubber. Optionally, the portion 52 may be made of isoprene, butyl, ethylene acrylate, EPDM or any other suitable elastomer including thermoplastic elastomers. The bushing member 50 compresses the isolator's foamed elastomer material. The hardness of the rubber is in the range of 40 to 80 Shore A hardness. The rubber member 50 improves the stiffness rate in the lateral and fore and aft directions. In some applications, it may be desirable to reduce the stiffness rate in the fore and aft direction as compared to the lateral stiffness rate. This can be accomplished by forming notches or axially extending partial cavities in the outer periphery of the member 50 so that in the fore and aft direction the foamed elastomeric material of the isolator 12 has less precompression than in the lateral direction. Thus, the lateral stiffness is greater than the fore and aft stiffness and both the lateral and fore and aft stiffness are greater than the vertical stiffness. This produces a feeling of better ride quality as well as providing better noise isolation for a vehicle.

While the invention has been described in connection with a preferred embodiment, it will be understood that it is not intended to limit the invention to that embodiment only. On the contrary, it is intended to cover all alternative modifications and equivalents that may be included within the spirit and scope of the invention as defined by the appended claims.

We claim:

1. A combination of a vehicular subframe and an isolation mount, the combination comprising:

a vehicular subframe having a first surface, a second surface, and a through hole that extends between the first and second surfaces; and an isolation mount including a tubular member and an isolator, the tubular member including a tubular portion and a flange portion;

the isolator including a top portion, a bottom portion, a middle portion connecting the top and bottom portion and disposed within an outer periphery of the top and bottom portions, a through hole, and an annular hinge formed in the outer periphery of the middle portion of the isolator, wherein the isolator is inserted into the through hole of the subframe so that the top portion of the isolator is adjacent the first surface of the subframe and the bottom portion of the isolator is adjacent the second surface of the subframe, wherein the tubular portion of the tubular member is inserted into the through hole of the isolator so that the flange portion of the tubular member compresses the top portion of the isolator to move the top portion radially outwardly of the through hole of the isolator, wherein the hinge of the isolator facilitates the compression of the top portion.

2. The combination specified in claim 1 wherein the hinge of the isolator has a semi-circular cross section.

3. The combination specified in claim 1 wherein the isolator is formed from microcellular polyurethane.

4. The combination specified in claim 1 including a washer adjacent the bottom portion of the isolator opposite the second surface of the subframe; and a fastener inserted into the tubular portion of the tubular member.

5. The combination specified in claim 1 wherein the tubular portion and the flange portion of the tubular member are integrally formed.

6. An isolation mount mounted on a vehicular subframe having first and second surfaces, the isolation mount comprising:

an isolator having a first portion adjacent to a first surface of the subframe, a second portion adjacent to the second surface of the subframe, a middle portion connecting the first and second portion and disposed within an outer periphery of the first and second portions, and an annular hinge formed on an outer periphery of the middle portion adjacent the first portion of the isolator;

a tubular member having tubular portion and a flange engaging and compressing the first portion of the isolation, wherein the hinge of the isolator facilitates movement of the first portion of the isolator radially outward as the first portion is compressed axially;

a washer engaging and compressing the second portion of the isolator; and a fastener inserted into the tubular portion of the tubular member.

7. The isolation mount specified in claim 6 wherein the hinge of the isolator has a semi-circular cross section.

8. The isolation mount specified in claim 6 wherein the isolator is formed from microcellular polyurethane.

* * * * *